March 19, 1935.  J. H. BROWN  1,994,978
BONNET OR CAP FOR FASTENING DEVICES
Filed Feb. 5, 1934

INVENTOR,
John H. Brown,
BY
Harry W. Bowen.
ATTORNEY.

Patented Mar. 19, 1935

1,994,978

UNITED STATES PATENT OFFICE 1,994,978

BONNET OR CAP FOR FASTENING DEVICES

John H. Brown, Springfield, Mass.

Application February 5, 1934, Serial No. 709,782

2 Claims. (Cl. 85—50)

This invention relates to improvements in bonnets, or caps, for fastening devices.

An object of my invention is to provide a bonnet for fastening devices, which will completely cover and conceal the head, or normally exposed portion, of the fastening device, and which may also be adjustably positioned relative to the fastening device it is designed to cover.

This, and other objects and advantages of my invention will be more completely disclosed and described in the specification, the accompanying drawing, and the appended claims.

Broadly, my invention comprises a cup-shaped member formed with an elongated slot in its base portion and a cap, or bonnet member, for covering and enclosing the cup-shaped member, means being provided for removably securing the bonnet member to the cup member.

Flanged fixtures, such as closet bowls, lavatories, tubs, etc., are generally provided with openings in the flanges for the insertion of fastening devices, such as screws, bolts, or the like. These openings often vary considerably in their position, relative to the side wall of the fixture, with the result that the heads of the fastening devices are often out of line and present an unsightly appearance. If the openings in the flanges of the fixtures are formed purposely larger than the fastening device intended for use in co-operation therewith, to compensate for the variability of the openings, the objection is not overcome, as washers, or similar devices, must be used under the head of the fastening device to cover the excess area of the opening. It is among the objects of this invention to provide a bonnet for covering the fastening devices, incorporating in its construction, means for compensating for the variability in location of the openings, thereby, permitting the bonnet member on any one fixture to be aligned with each other.

A preferred embodiment of my invention is illustrated in the accompanying drawing, in which.

Referring now to the drawing in detail, in which like numerals refer to like parts throughout:—

Figure 1:
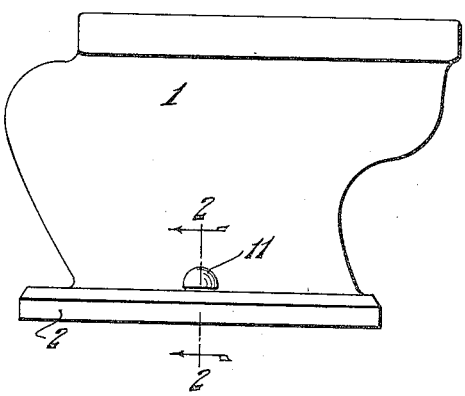
Fig. 1 is an elevational view of a closet fixture, showing a bonnet secured on the flange.
Figure 2:
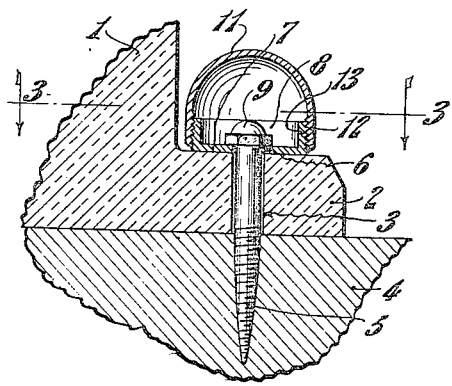
Fig. 2 is a cross-sectional view on the line 2—2 of Fig. 1.
Figure 3:
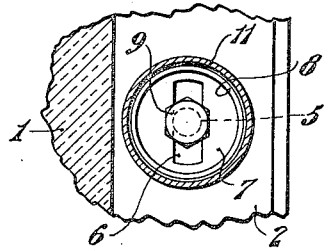
Fig. 3 is a sectional view on the line 3—3 of Fig. 2.
Figure 4:
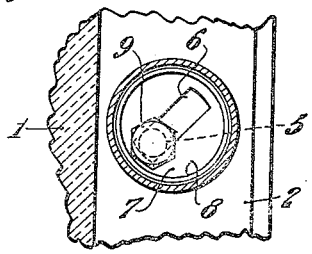
Figs. 4 and 5 are views similar to Fig. 3, showing other possible positions of the bonnet device, relative to the fastening device.
Figure 5:
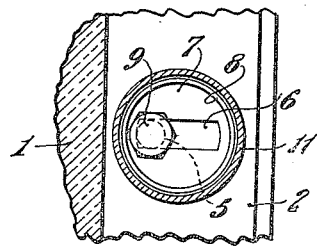
Figure 6:
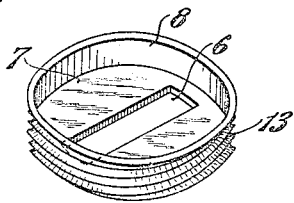
Fig. 6 is a perspective view of the cup-shaped bottom part of the bonnet device.

A closet fixture 1, formed with a flange 2, provided with opening 3 therein, is secured on a floor, or other foundation 4, by means of a screw 5 passing through the opening 3. Before the screw 5 is inserted in the opening 3, it is first passed through an elongated slot 6, formed in a bottom portion 7 of a cup-shaped member 8. When the screw 5 is then inserted in the opening 3 and screwed down to its final seat, the head portion 9 rests on the bottom 7, thus firmly securing the member 8 to the flange 2. Before the screw is tightened completely, the member 8 may be revolved around the screw 5, as illustrated in Figs. 3, 4, and 5, and the axis of the member 8 varied, relative to the axis of the screw 5, to compensate for variability in the location of the openings 3 in the flange 2. The opening 3 will be completely covered by the member 8, and the member 8 may be positioned, relative to the wall 10 of the fixture 1, as desired. After the member 8 has been properly positioned and the screw 5 finally tightened, a bonnet member 11 is secured on the member 8.

In the preferred embodiment of my invention, illustrated in the drawing, I have shown threads 12 formed on the interior of the bonnet member 11, engaging threads 13, formed on the exterior of the member 8. I do not confine myself to this construction, however, as it will be readily understood by those skilled in the art that other securing means may be employed, such as pins or studs and bayonet slots, a frictional or press fit, etc.

These bonnets may be made of any suitable material, and may be colored to match the articles with which they are intended to be used.

What I claim is:

1. As an article of manufacture, a member having a flat base portion with an elongated slot therein, and a flange portion with external threads thereon, a semispherical cap having threads on its inner surface for engaging the external threads of the flange portion, the construction being such that when a securing device is inserted in the elongated slot, the article may be turned on the securing device relative to a vertical wall or the like.

2. A cover for fastening devices for securing a flange member to a support, the flange being adjacent a wall member comprising, a base member having a bottom portion and a flange portion extending upwardly from said bottom portion, said bottom portion being formed with an elongated opening therein for receiving a securing member in the said flange member, and said flange portion of the base member being formed with threads on its exterior surface, and a cap member formed with threads on the interior surface for engagement with the threads on the base member, the construction and arrangement being such that the base member and its cap may be adjusted on the flange member and relative to said wall member.

JOHN H. BROWN.